June 26, 1962 V. G. VAUGHAN 3,041,515
PROTECTIVE CIRCUIT
Filed Dec. 22, 1960
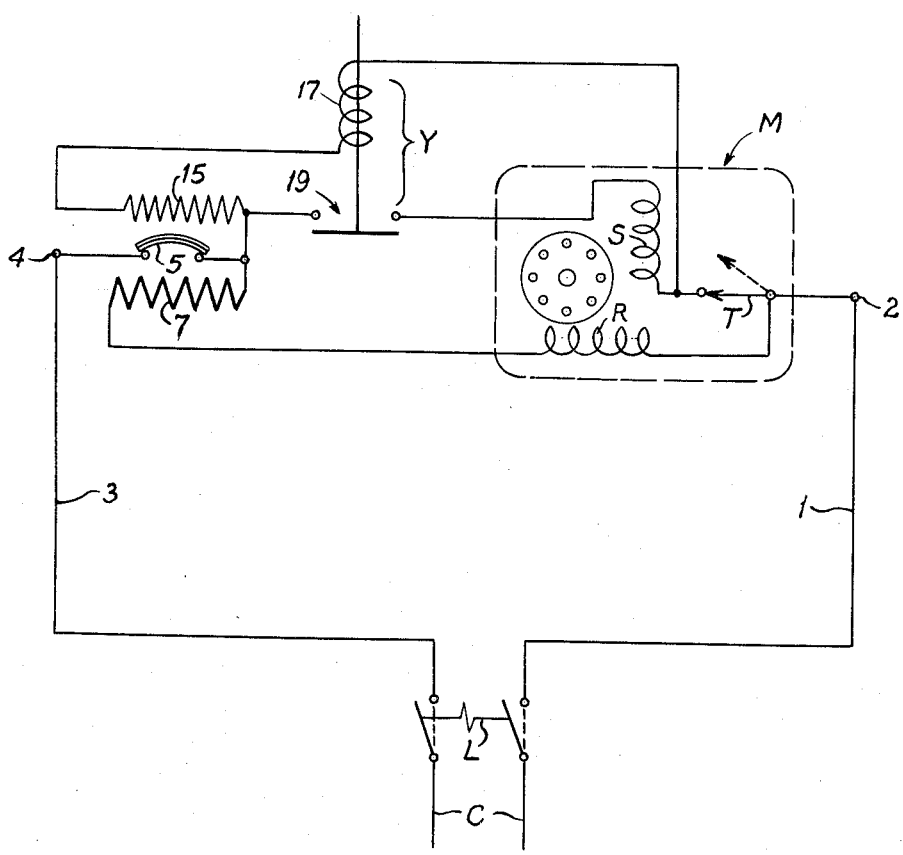
Victor G. Vaughan,
Inventor,
Koenig and Pope,
Attorneys.

United States Patent Office 3,041,515
Patented June 26, 1962

3,041,515
PROTECTIVE CIRCUIT
Victor G. Vaughan, Corpus Christi, Tex., assignor to Texas Instruments Incorporated, Dallas, Tex., a corporation of Delaware
Filed Dec. 22, 1960, Ser. No. 77,698
6 Claims. (Cl. 318—221)

This invention relates to protective circuits, and with regard to certain more specific features, to a fail-safe protective circuit for energy-translating devices such as motors having run and start windings.

Among the several objects of the invention may be noted the provision of a fail-safe protective circuit for overload protection of energy-translating devices such as motors having both start and run windings; the provision of a protective circuit of the class described having a voltage type of heater for protection of a start winding, so arranged that if an open circuit occurs in connection with the voltage heater, the start winding is not, as heretofore, left unprotected; and the provision of a circuit of the class described which permits the use of a more readily determinable parameter than heretofore for the selection of such voltage type heaters. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims, and which is illustrated in the single FIGURE of the accompanying drawing.

Referring to the drawing, letter M indicates, for example, a motor to be protected, having a start winding S, a run winding R, and a starting switch T. At C is shown a supply circuit in which is a line switch L. The two sides of the circuit are shown at 1 and 3. These sides extend to terminals 2 and 4, respectively. Numeral 5 indicates a thermostatic switch adapted when cold to be closed and when heated to open. Heating may be induced either by motor current or motor temperature or both. Thus it may or may not be in heat-exchange relationship to the motor M. This switch may be of the snap-acting disc type which automatically recloses upon cooling, or it may be of the reset type requiring manual reclosing after it has once opened.

At numeral 7 is shown a heating element in heat-exchange relationship with the thermostatic switch 5. This element 7 is of the type having a relatively large current-carrying capacity and of relatively low ohmic resistance, referred to hereinafter as a current heater. The thermostatic switch 5, heater 7 and run winding R are connected in series arcoss points 2 and 4.

At numeral 15 is shown an auxiliary heater of relatively high ohmic resistance and of small current-carrying capacity, hereinafter referred to as a voltage heater. At numeral 17 is shown the operating coil component of a series relay Y, the normally open switch component of which is indicated at 19. Switch element 19 closes only when coil 17 carries current. The switch 5, voltage heater 15, coil 17 and starting switch T are connected in series across the points 2 and 4.

The starting switch T, start winding S, switch element 19 of relay Y and thermostatic switch 5 are also in a series connection across the points 2 and 4.

While the series relay Y is shown as being of the magnetic type, thermal or other forms of relays may be employed which are directly or indirectly responsive to a flow of current for operating switch component 19. The starting switch T may be of any suitable type such as, for example, the centrifugal type which is normally closed when the motor is at rest and adapted to open at an appropriate interval after the motor starts and approaches running speed.

The drawing shows the line switch L open, motor M at rest and the starting switch T closed. The switch 19 of relay Y is open, its coil 17 being deexcited. When the line switch L is closed (as shown by dotted lines), one branch of current is established through the run winding R, main current heater 7 and thermostatic switch 5. Another branch is established through closed starting switch T, relay coil 17, voltage heater 15, and thermostatic switch 5. This closes the switch 19 of relay Y, thus establishing a third branch of current through the start winding S, and switches 19 and 5.

The circuit protects the start winding against burn-out, should a failure occur of the voltage resistance 15 or in the current branch containing it. Thus if the heater 15 fails, so does current to the coil 17, and switch contacts 19 open to prevent damaging current from flowing through the start winding S. The importance of this feature will be fully appreciated when it is understood that voltage heaters such as 15 are not as rugged and reliable as current heaters such as 7 and unless over safely designed may require frequent replacement. By means of the invention such resistances may be easily designed on the basis of a single easily determined parameter, that is with a voltage drop close to line voltage, without endangering the winding S. Such design on the basis of a single simple parameter is also of great convenience to unskilled repairmen in selecting replacements for damaged heaters 15, since simply matching the voltage drop of the replacement voltage heater with a given line voltage is not difficult to accomplish.

While the invention has been described as useful for the protection of a motor having running and starting current-carrying winding components or coils to be protected, it will be understood from the above that it is applicable to other energy-translating devices having a plurality of current-carrying components to be analogously protected.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

I claim:

1. A fail-safe protective circuit for an energy-translating device having several current-carrying components to be protected, comprising a supply circuit, a thermostatic switch, a current heater and a voltage heater in heat-exchange relationship with said thermostatic switch, a relay having a normally open switch element and an operating element therefor responsive to current flow to close its switch element, said thermostatic switch, current heater and one of said current-carrying components of the device establishing in series therebetween a first current-carrying branch across said supply circuit, said thermostatic switch, the switch element of the relay and the other current-carrying component of the device establishing in series therebetween a second current-carrying branch across the supply circuit, said thermostatic switch, said voltage heater and said operating element of the relay establishing in series therebetween a third current-carrying branch across the supply circuit.

2. A protective circuit according to claim 1, wherein said energy-translating device is a motor, and said components are constituted by two different windings therein.

3. A fail-safe protective circuit for a motor having run and start windings and a starting switch, comprising a supply circuit, a thermostatic switch, a current heater and a voltage heater in heat-exchange relationship with said thermostatic switch, a relay having a normally open switch element and an operating element therefor responsive to current flow through the starting switch to close the relay switch element, said thermostatic switch, current heater and the run winding establishing in series therebetween a first current-carrying branch across said supply circuit, said branch shunting said starting switch, said thermostatic switch, the switch element of the relay, the start winding and starting switch establishing in series therebetween a second current-carrying branch across the supply circuit, said thermostatic switch, voltage heater, said operating element of the relay and the starting switch establishing in series therebetween a third current-carrying branch across the supply circuit.

4. A protective circuit according to claim 3, wherein the value of the voltage drop of the voltage heater approximates the value of the voltage of the supply circuit.

5. A fail-safe protective circuit for an energy-translating device having several current-carrying components to be protected, comprising a supply circuit, a thermostatic switch, a voltage heater in heat-exchange relationship with said thermostatic switch, a relay having a normally open switch element and an operating element therefor responsive to current flow to close its switch element, said thermostatic switch, and one of said current-carrying components of the device establishing in series therebetween a first current-carrying branch across said supply circuit, said thermostatic switch, the switch element of the relay and the other current-carrying component of the device establishing in series therebetween a second current-carrying branch across the supply circuit, said thermostatic switch, said voltage heater and said operating element of the relay establishing in series therebetween a third current-carrying branch across the supply circuit.

6. A fail-safe protective circuit for a motor having run and start windings and a starting switch, comprising a supply circuit, a thermostatic switch, a voltage heater in heat-exchange relationship with said thermostatic switch, a relay having a normally open switch element and an operating element therefor responsive to current flow through the starting switch to close the relay switch element, said thermostatic switch, and the run winding establishing in series therebetween a first current-carrying branch across said supply circuit, said branch shunting said starting switch, said thermostatic switch, the switch element of the relay, the start winding and starting switch establishing in series therebetween a second current-carrying branch across the supply circuit, said thermostatic switch, voltage heater, said operating element of the relay and the starting switch establishing in series therebetween a third current-carrying branch across the supply circuit.

No references cited.